(12) United States Patent
Fjeldheim et al.

(10) Patent No.: US 11,208,265 B2
(45) Date of Patent: Dec. 28, 2021

(54) CONTAINER HANDLING VEHICLE

(71) Applicant: Autostore Technology AS, Nedre Vats (NO)

(72) Inventors: Ivar Fjeldheim, Haugesund (NO); Trond Austrheim, Etne (NO)

(73) Assignee: Autostore Technology AS, Nedre Vats (NO)

( * ) Notice: Subject to any disclaimer, the term of this patent is extended or adjusted under 35 U.S.C. 154(b) by 94 days.

(21) Appl. No.: 16/648,548

(22) PCT Filed: Aug. 27, 2018

(86) PCT No.: PCT/EP2018/072957
§ 371 (c)(1),
(2) Date: Mar. 18, 2020

(87) PCT Pub. No.: WO2019/057442
PCT Pub. Date: Mar. 28, 2019

(65) Prior Publication Data
US 2020/0216263 A1    Jul. 9, 2020

(30) Foreign Application Priority Data
Sep. 20, 2017  (NO) .................................. 20171511

(51) Int. Cl.
*B65G 1/04* (2006.01)
*B65G 1/137* (2006.01)
*G05B 15/02* (2006.01)

(52) U.S. Cl.
CPC ......... *B65G 1/0464* (2013.01); *B65G 1/0492* (2013.01); *B65G 1/1378* (2013.01);
(Continued)

(58) Field of Classification Search
CPC combination set(s) only.
See application file for complete search history.

(56) References Cited

U.S. PATENT DOCUMENTS

| 5,816,774 A | 10/1998 | Stolzer et al. |
| 2015/0127143 A1* | 5/2015 | Lindbo .................. G05B 15/02 700/218 |

(Continued)

FOREIGN PATENT DOCUMENTS

| DE | 29806424 U1 | 8/1999 |
| FR | 1431799 A | 3/1966 |

(Continued)

OTHER PUBLICATIONS

International Search Report issued in PCT/EP2018/072957 dated Nov. 29, 2018 (6 pages).
(Continued)

*Primary Examiner* — Kyle O Logan
(74) *Attorney, Agent, or Firm* — Osha Bergman Watanabe & Burton (57) ABSTRACT

A container handling vehicle for an automated storage and retrieval system includes a three-dimensional grid having multiple storage columns, in which containers are stored one on top of another in vertical stacks. The container handling vehicle is arrangeable above a top level of the grid for retrieving a container from, and storing a container in, at least some of the storage columns, and/or for transporting a container horizontally across the top level of the grid. The container handling vehicle has a lifting device including a lifting frame for releasable connection to a container, and lifting bands arranged to lower and raise the lifting frame relative to the storage columns. The lifting device includes a container centring device arranged to extend around portions of the lifting frame. The container centring device having a lower open end including at least one edge element for interaction with a peripheral part of the upper end of a storage column. The edge element is arranged such that a container connected to the lifting frame is centred relative (Continued)

said upper end when the edge element interacts with the peripheral part.

16 Claims, 9 Drawing Sheets

(52) U.S. Cl.
CPC ...... *B65G 2201/0235* (2013.01); *G05B 15/02* (2013.01); *G05D 2201/0216* (2013.01)

(56) References Cited

U.S. PATENT DOCUMENTS

| | | | | |
|---|---|---|---|---|
| 2016/0129587 A1* | 5/2016 | Lindbo | .............. | G05B 19/4189 700/218 |
| 2016/0145058 A1* | 5/2016 | Lindbo | ................ | B65G 1/0485 700/218 |
| 2016/0325932 A1* | 11/2016 | Hognaland | .......... | B65G 1/0478 |
| 2018/0065804 A1* | 3/2018 | Hognaland | .......... | B65G 1/0464 |
| 2018/0075402 A1* | 3/2018 | Stadie | .................... | B65G 1/065 |
| 2018/0162639 A1* | 6/2018 | Ingram-Tedd | ....... | B65G 1/1378 |
| 2018/0194571 A1* | 7/2018 | Fryer | .................... | B65G 1/0464 |
| 2018/0237221 A1* | 8/2018 | Lindbo | ................ | B65G 1/0464 |
| 2018/0244467 A1* | 8/2018 | Hognaland | .......... | B65G 1/0464 |
| 2018/0346243 A1* | 12/2018 | Lindbo | ................ | B65G 1/0464 |
| 2019/0031399 A1* | 1/2019 | Shaikh | ............... | B65D 21/0209 |
| 2019/0054932 A1* | 2/2019 | Stadie | ....................... | B08B 3/02 |
| 2019/0375588 A1* | 12/2019 | Lindbo | ................ | B65G 1/0492 |
| 2020/0031575 A1* | 1/2020 | Hognaland | ................ | B25J 5/02 |

FOREIGN PATENT DOCUMENTS

| | | |
|---|---|---|
| GB | 892665 A | 3/1962 |
| JP | S60-209433 A | 10/1985 |
| NO | 317366 B1 | 10/2004 |
| NO | 20170360 A1 | 9/2018 |
| WO | 2012/064506 A1 | 5/2012 |
| WO | 2013/167907 A1 | 11/2013 |
| WO | 2014/090684 A1 | 6/2014 |
| WO | 2015/193278 A1 | 12/2015 |
| WO | 2017/129384 A1 | 8/2017 |
| WO | 2018/162757 A1 | 9/2018 |

OTHER PUBLICATIONS

Written Opinion of the International Searching Authority issued in PCT/EP2018/072957 dated Nov. 29, 2018 (8 pages).

Norwegian Search Report issued in No. 20171511 dated Apr. 20, 2018 (2 pages).

\* cited by examiner

CONTAINER HANDLING VEHICLE

TECHNICAL FIELD

The present invention relates to the technical field of automated storage and retrieval systems. In particular, the present invention relates to a container handling vehicle for an automated container storage and retrieval system and such a system comprising the container handling vehicle.

BACKGROUND AND PRIOR ART

Figure 1:
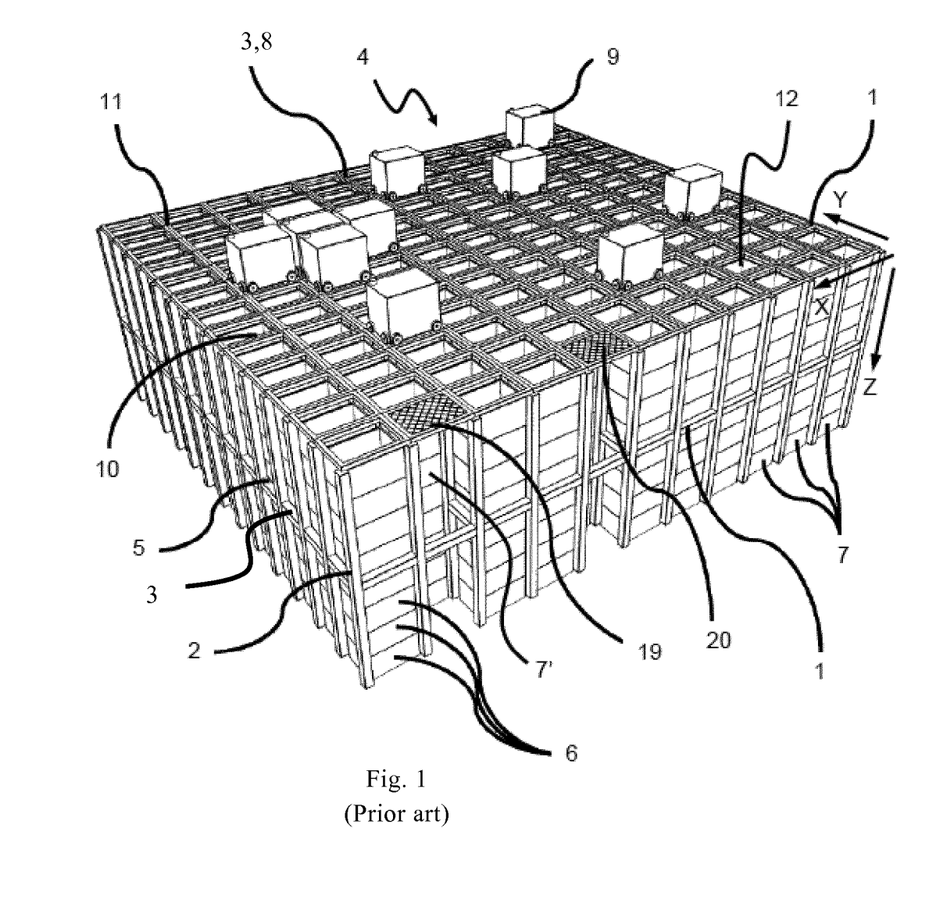
FIG. 1 is a perspective view of a grid of a prior art automated storage and retrieval system.
Figure 2A:
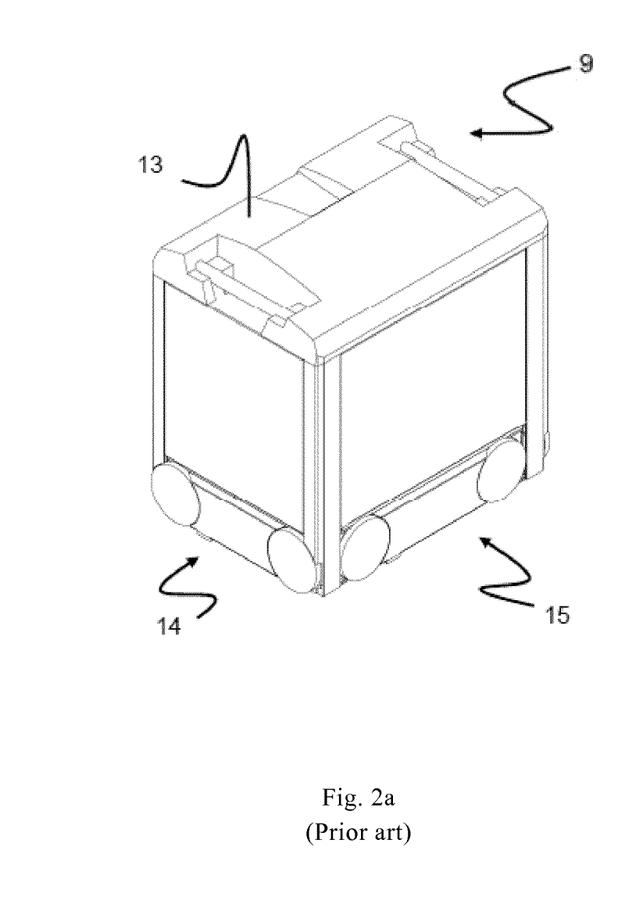
FIG. 2a is a perspective view of a first prior art container handling vehicle.
Figure 2B:
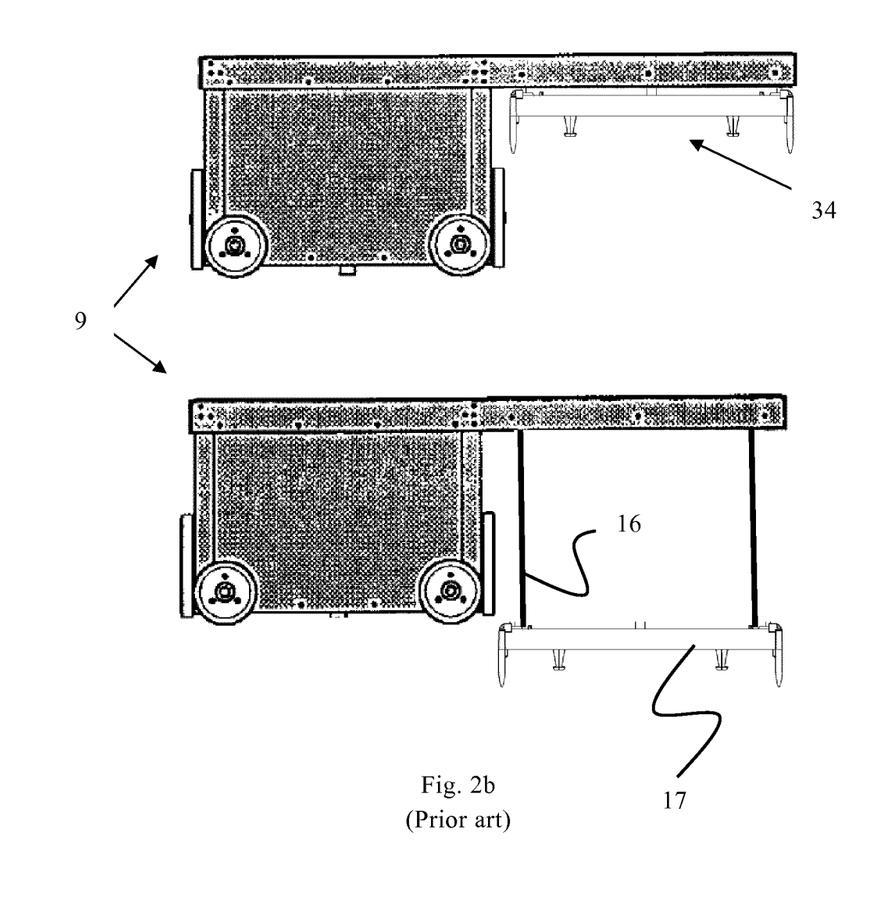
FIG. 2b are side views of a second prior art container-handling vehicle showing a lifting device.

FIG. 1 discloses a framework structure 1 of a typical prior art automated storage and retrieval system and FIGS. 2a and 2b disclose known container-handling vehicles of such a system.

The framework structure 1 comprises a plurality of upright members 2 and a plurality of horizontal members 3, which are supported by the upright members 2. The members 2, 3 may typically be made of metal, e.g. extruded aluminium profiles.

The framework structure 1 defines a storage grid 4 comprising storage columns 5 arranged in rows, in which storage columns 5 storage containers 6, also known as containers, are stacked one on top of another to form stacks 7. Each storage container 6 may typically hold a plurality of product items (not shown), and the product items within a storage container 6 may be identical, or may be of different product types depending on the application. The framework structure 1 guards against horizontal movement of the stacks 7 of storage containers 6, and guides vertical movement of the containers 6, but does normally not otherwise support the storage containers 6 when stacked.

The upper horizontal members 3 comprise a rail system 8 arranged in a grid pattern across the top of the storage columns 5, on which rail system 8 a plurality of container-handling vehicles 9 are operated to raise storage containers 6 from and lower storage containers 6 into the storage columns 5, and also to transport the storage containers 6 above the storage columns 5. The rail system 8 comprises a first set of parallel rails 10 arranged to guide movement of the container-handling vehicles 9 in a first direction X across the top of the frame structure 1, and a second set of parallel rails 11 arranged perpendicular to the first set of rails 10 to guide movement of the container-handling vehicles 9 in a second direction Y, which is perpendicular to the first direction X, see FIG. 3. In this way, the rail system 8 defines an upper end of grid columns 12 above which the container-handling vehicles 9 can move laterally above the storage columns 5, i.e. in a plane, which is parallel to the horizontal X-Y plane.

Each container-handling vehicle 9 comprises a vehicle body 13 and first and second sets of wheels 14, 15 which enable the lateral movement of the container-handling vehicle 9, i.e. the movement in the X and Y directions. In FIG. 2, two wheels in each set are visible. The first set of wheels 14 is arranged to engage with two adjacent rails of the first set 10 of rails, and the second set of wheels 15 arranged to engage with two adjacent rails of the second set 11 of rails. One of the set of wheels 14, 15 can be lifted and lowered, so that the first set of wheels 14 and/or the second set of wheels 15 can be engaged with their respective set of rails 10, 11 at any one time.

Each container-handling vehicle 9 also comprises a lifting device 34 (not shown in FIGS. 1 and 2a) for vertical transportation of storage containers 6, e.g. raising a storage container 6 from and lowering a storage container 6 into a storage column 5. The lifting device 34 comprises a lifting frame (not shown in FIG. 2a, but similar to the one shown in FIG. 2b labelled 17) which is adapted to engage a storage container 6, which lifting frame can be lowered from the vehicle body 13 so that the position of the lifting frame with respect to the vehicle body 13 can be adjusted in a third direction Z, which is orthogonal the first direction X and the second direction Y.

Conventionally, and for the purpose of this application, Z=1 identifies the uppermost layer of the grid 4, i.e. the layer immediately below the rail system 8 (in the present application, the rail system 8 is termed the top level of the grid), Z=2 is the second layer below the rail system 8, Z=3 is the third layer etc. In the embodiment disclosed in FIG. 1, Z=8 identifies the lowermost, bottom layer of the grid 4. Consequently, as an example and using the Cartesian coordinate system X, Y, Z indicated in FIG. 1, the storage container identified as 7' in FIG. 1 can be said to occupy grid location or cell X=10, Y=2, Z=3. The container-handling vehicles 9 can be said to travel in layer Z=0 and each grid column can be identified by its X and Y coordinates.

Each container-handling vehicle 9 comprises a storage compartment or space for receiving and stowing a storage container 6 when transporting the storage container 6 across the grid 4. The storage space may comprise a cavity arranged centrally within the vehicle body 13, e.g. as is described in WO2014/090684A1, the contents of which are incorporated herein by reference.

Alternatively, the container-handling vehicles may have a cantilever construction, as is described in NO317366, the contents of which are also incorporated herein by reference.

The container-handling vehicles 9 may have a footprint, i.e. an extension in the X and Y directions, which is generally equal to the lateral or horizontal extension of a grid column 12, i.e. the extension of a grid column 12 in the X and Y directions, e.g. as is described in WO2015/193278A1, the contents of which are incorporated herein by reference. Alternatively, the container-handling vehicles 9 may have a footprint which is larger than the lateral extension of a grid column 12, e.g. as is disclosed in WO2014/090684A1.

Figure 3:
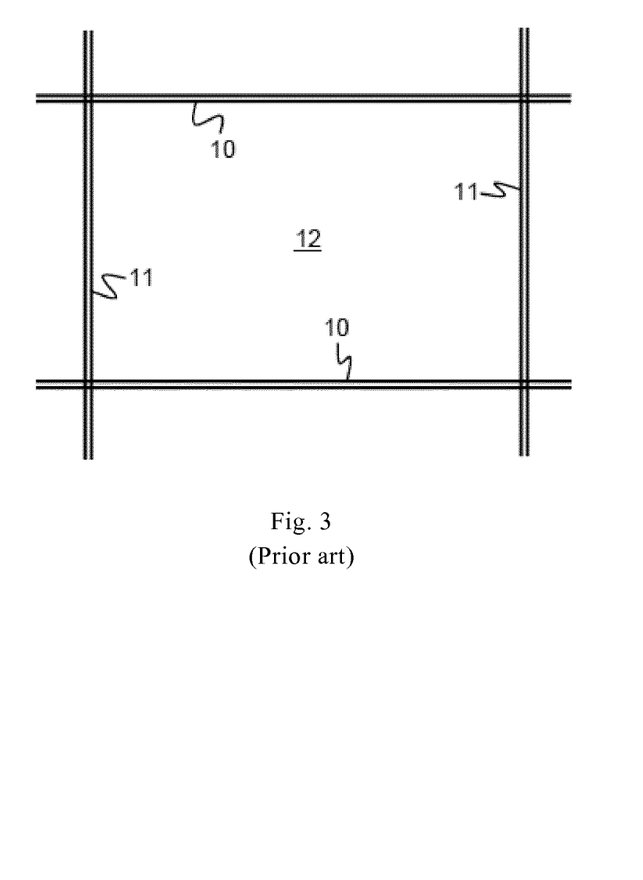
FIG. 3 is a top view of a prior art single rail grid.
Figure 4:
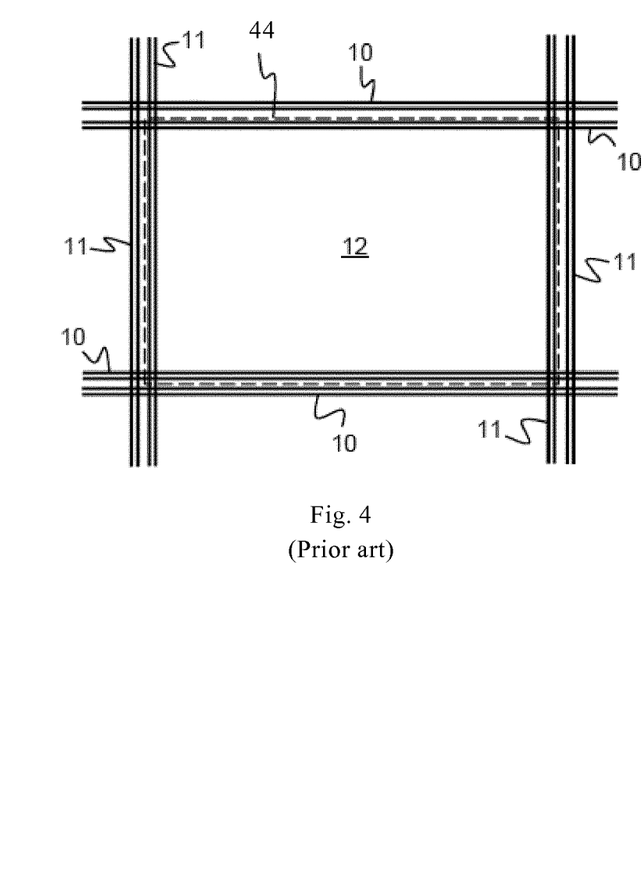
FIG. 4 is a top view of a prior art double rail grid.

The rail system 8 may be a single rail system, as is shown in FIG. 3. Alternatively, the rail system 8 may be a double rail system, as is shown in FIG. 4, thus allowing a container-handling vehicle 9 having a footprint 44 generally corresponding to the lateral extension of a grid column 12 to travel along a row of grid columns in either an X or Y direction even if another container-handling vehicle 9 is positioned above a grid column neighbouring that row.

In a storage grid, a majority of the grid columns 12 are storage columns 5, i.e. grid columns where storage containers are stored in stacks. However, a grid normally has at least one grid column which is used not for storing storage containers, but which comprises a location where the container-handling vehicles can drop off and/or pick up storage containers so that they can be transported to an access station where the storage containers can be accessed from outside of the grid or transferred out of or into the grid, i.e. a container handling station. Within the art, such a location is normally referred to as a "port" and the grid column in which the port is located may be referred to as a port column.

The grid 4 in FIG. 1 comprises two port columns 19 and 20. The first port column 19 may for example be a dedicated drop-off port column where the container-handling vehicles 9 can drop off storage containers to be transported to an access or a transfer station (not shown), and the second port 20 column may be a dedicated pick-up port column where the container-handling vehicles 9 can pick up storage containers that have been transported to the grid 4 from an access or a transfer station.

When a storage container 6 stored in the grid 4 disclosed in FIG. 1 is to be accessed, one of the container-handling vehicles 9 is instructed to retrieve the target storage container from its position in the grid 4 and transport it to the drop-off port 19. This operation involves moving the container-handling vehicle 9 to a grid location above the storage column in which the target storage container is positioned, retrieving the storage container from the storage column using the container-handling vehicle's lifting device (not shown, being internally arranged in a central cavity of the vehicle, but similar to the lifting device 34 of the second prior art vehicle of FIG. 2b), and transporting the storage container to the drop-off port 19. A second prior art vehicle 9 is shown in FIG. 2b to better illustrate the general design of the lifting device. Details of the second vehicle 9 are described in the Norwegian patent NO317366. The lifting devices 34 of both prior art vehicles 9 comprise a set of lifting bands 16 connected close to the corners of a lifting frame 17 (may also be termed a gripping device) for releasable connection to a storage container. To raise or lower the lifting frame 17 (and optionally a connected storage container), the lifting bands 16 are spooled on/off at least one rotating lifting shaft (not shown) arranged in the container-handling vehicle. Various designs of the at least one lifting shaft are described in for instance WO2015/193278 A1 and PCT/EP2017/050195. If the target storage container is located deep within a stack 7, i.e. with one or a plurality of other storage containers positioned above the target storage container, the operation also involves temporarily moving the above-positioned storage containers prior to lifting the target storage container from the storage column. This step, which is sometimes referred to as "digging" within the art, may be performed with the same container-handling vehicle that is subsequently used for transporting the target storage container to the drop-off port 19, or with one or a plurality of other cooperating container-handling vehicles. Alternatively, or in addition, the automated storage and retrieval system may have container-handling vehicles specifically dedicated to the task of temporarily removing storage containers from a storage column. Once the target storage container has been removed from the storage column, the temporarily removed storage containers can be repositioned into the original storage column. However, the removed storage containers may alternatively be relocated to other storage columns.

When a storage container 6 is to be stored in the grid 4, one of the container-handling vehicles 9 is instructed to pick up the storage container from the pick-up port 20 and transport it to a grid location above the storage column where it is to be stored. After any storage containers positioned at or above the target position within the storage column stack have been removed, the container-handling vehicle 9 positions the storage container at the desired position. The removed storage containers may then be lowered back into the storage column, or relocated to other storage columns.

For monitoring and controlling the automated storage and retrieval system, e.g. monitoring and controlling the location of respective storage containers within the grid 4, the content of each storage container 6 and the movement of the container-handling vehicles 9 so that a desired storage container can be delivered to the desired location at the desired time without the container-handling vehicles 9 colliding with each other, the automated storage and retrieval system comprises a control system, which typically is computerised and comprises a database for keeping track of the storage containers.

A problem associated with known automated storage and retrieval systems is that the top level of the grid 4 may become congested with container-handling vehicles performing drop off or pick up of storage containers. This may impede the operation of the automated storage and retrieval system since the travel path of the container handling vehicles on top of the grid is not optimal.

A solution to this problem is to arrange a second set of container-handling vehicles on a second level arranged above the top level of the grid 4, such that the second set of container handling vehicles may pass above the container-handling vehicles arranged at the top level of the grid. In this manner, a storage and retrieval system may comprise an increased number of container-handling vehicles without compromising the efficiency of each vehicle due to congestion.

WO 2013/167907 discloses the use of a gantry arranged at a level above the top level (i.e. where the top level corresponds to the rail system 8 in FIG. 1) of a grid. A first container-handling vehicle is arranged on the gantry, such that the first container handling vehicle may move above a second container-handling vehicle operating on the top level. The first container-handling vehicle arranged on the gantry has a lifting device comprising a set of lifting arms able to lift multiple bins/containers. However, the use of a container-handling vehicle having lifting arms as disclosed in WO 2013/167907, restricts the depth at which containers/bins may be retrieved from a storage column.

The use of container-handling vehicles having a lifting device as described above for the prior art vehicles 9 arranged on a level above the top level of the grid, for instance on a gantry as discussed in WO 2013/167907, would apparently provide the advantages of increased efficiency, while at the same time allow for an increased flexibility regarding the depth at which containers/bins may be retrieved from/introduced to a storage column. However, the lifting frame and any container connected thereto, has to be introduced into, or retrieved from, the storage column with a very high degree of accuracy due to the tight fit between the inner surfaces of the storage column and the outer periphery of the container/lifting frame. Any deviation or slight inclination of the container/lifting frame with respect to the horizontal cross-section of the storage column will often lead to the container/lifting frame not being able to enter the storage column, or even worse, being stuck within the storage column. If a prior art container-handling vehicle having a lifting device as described above for the prior art vehicles 9, were to be arranged on a level above the top level of the grid, the increased unguided travel distance between said level and the top level of the grid, would introduce an increased risk of deviation or slight inclination of the container/lifting frame with respect to the horizontal cross-section of the storage column. Consequently, the risk of error when retrieving/introducing a storage container from/to a storage column would increase.

In view of the above, it would be highly advantageous to provide a container-handling vehicle having an improved lifting device for conveying a container to or from a storage column.

SUMMARY OF THE INVENTION

The present invention is defined in the attached claims and in the following:

In a first aspect, the present invention provides a container handling vehicle for an automated storage and retrieval system comprising a three-dimensional grid having multiple storage columns, in which containers are stored one on top of another in vertical stacks, the container handling vehicle is arrangeable above a top level of the grid for retrieving a container from, and storing a container in, at least some of the storage columns, and/or for transporting a container horizontally across the top level of the grid; the container handling vehicle features a lifting device comprising a lifting frame for releasable connection to a container and lifting bands arranged to lower and raise the lifting frame relative the storage columns, wherein the lifting device comprises a container centring device arranged to extend around portions of the lifting frame, the container centring device having a lower open end comprising at least one edge element for interaction with a peripheral part of the upper end of a storage column, the edge element arranged such that a container connected to the lifting frame, and/or the lifting frame, is centred relative said upper end when the edge element interact with the peripheral part. The lower open end of the centring device has an inner periphery allowing entry and exit of a storage container.

When a container is connected to the lifting frame, the container centring device is arranged to extend around portions of the container when the at least one edge element is not interacting with a peripheral part of the upper end of a storage column.

In one embodiment of the container handling vehicle, the container centring device is supported by the lifting frame, such that the lifting frame may be lowered relative the centring device when the edge element of the container centring device interacts with the peripheral part of the upper end of the storage column. In other words, when the container centring device is prevented from being lowered further relative the upper end of the storage column, the lifting frame may be lowered relative the centring device and into the storage column.

In one embodiment, the container centring device is supported by the lifting frame, such that the lifting frame may be lowered relative the centring device when the centring device is stationary.

In one embodiment of the container handling vehicle, the container centring device comprises a vertical side element and a top element, the side element comprising the at least one edge element, and the top element is arranged above, and supported by, the lifting frame when the edge element is not interacting with the peripheral part.

In one embodiment of the container handling vehicle, the container centring device comprises multiple vertical side elements, preferably four vertical side elements, each of the vertical side elements interconnected by the top element, the side elements comprising the at least one edge element. Preferably, each of the multiple side elements comprises at least one edge element. Preferably the container centring device comprises four side elements, each side element arranged to be parallel to a respective side wall of an accommodated storage container. The side elements are preferably plate-shaped.

In case of a single vertical side element, the side element will preferably have a rectangular horizontal inner periphery, such that a storage container may be accommodated within the side element.

In one embodiment of the container handling vehicle, the at least one edge element is arranged to extend below a storage container connected to the lifting frame when the edge element is not interacting with the peripheral part.

In one embodiment of the container handling vehicle, the at least one edge element is arranged to interact with rails forming the peripheral part of the upper end of the storage column. Preferably, the at least one edge element is arranged to interact with a track/longitudinal recess in the rails forming the peripheral part of the upper end of the storage column. In other words, the peripheral part of the upper end of the storage column is made up of rails having tracks/longitudinal recesses. In a preferred embodiment, the track/longitudinal recess has a trapezoidal cross-section comprising inclined side walls.

In one embodiment of the container handling vehicle, the container centring device comprises at least one of a projection or recess for interaction with a cooperating recess or projection, respectively, on the lifting frame, such that a horizontal movement of the container centring device relative the lifting frame is prevented when the at least one edge element is not interacting with the peripheral part of the upper end of the storage column. The term recess is intended to mean any structural feature suitable for accommodating or receiving a projection, including a hole or a cut-out.

In one embodiment of the container handling vehicle, the top element comprises the at least one projection or recess of the container centring device, preferably the top element comprises at least two projections or recesses.

In one embodiment of the container handling vehicle, the top element of the centring device comprises openings/cut-outs or recesses through which the lifting bands are arranged. Each lifting band is connected to the lifting frame and may be spooled on/off at least one drum/spool/shaft arranged in the container handling vehicle, such that the lifting frame are raised/lowered.

In a second aspect, the present invention provides an automated storage and retrieval system comprising at least one first container handling vehicle according to any of the preceding claims, wherein the storage and retrieval system comprises a three-dimensional grid having multiple storage columns, in which containers are stored one on top of another in vertical stacks, and the first container handling vehicle is movably arranged above a top level of the grid, such that the first container handling vehicle may pass directly above a second container handling vehicle arranged on the top level of the grid, during operation of the system. The second container handling vehicle may be any vehicle suitable for moving on the top level of the grid for retrieving a container from, and storing a container in, at least some of the storage columns, and/or for transporting a container horizontally on the top level of the grid. The second container handling vehicle may feature a lifting device comprising a lifting frame for releasable connection to a container and lifting bands arranged to lower and raise the lifting frame relative the storage columns, i.e. the second container handling vehicle may for instance be any of the prior art container handling vehicles described above.

In other words, the first container handling vehicle is arranged to move in a first horizontal plane and the second container handling vehicle is arranged to move in a second horizontal plane wherein the vertical distance between the horizontal planes is sufficient to allow the first container handling vehicle to pass directly above the second container vehicle.

Alternatively, the first container handling vehicle may be termed an overhead container handling vehicle and the second container handling vehicle may be termed a grid-level container handling vehicle.

In one embodiment, the automated storage and retrieval system according to the second aspect comprises at least one horizontal beam arranged above the top level of the grid, on which beam the first container handling vehicle is movably arranged.

In one embodiment of the automated storage and retrieval system, the at least one horizontal beam is part of a gantry, monorail or rail grid, arranged such that the first container handling vehicle may move in at least one horizontal direction relative the top level of the grid.

In a third aspect, the present invention provides a container centring device for a container handling vehicle according to the first aspect. The container centring device comprises a vertical side element, comprising at least one edge element, and a top element arrangeable above the lifting frame.

In a fourth aspect, the present invention provides a method of lowering a container from a container handling device according to the first aspect to a storage column of a storage grid, comprising the steps of:

lowering the container connected to the lifting frame towards the storage column;

centring the container centring device relative an upper end of the storage column by interaction between at least one edge element on the container centring device and a rail arranged at the periphery of the upper end of the storage column; and lowering the container and the lifting frame relative to the container centring device into the storage column.

DRAWINGS

Certain embodiments of the present invention will now be described in detail by way of example only and with reference to the following drawings.

In the drawings, like reference numerals have been used to indicate like parts, elements or features unless otherwise explicitly stated or implicitly understood from the context.

DETAILED DESCRIPTION OF THE INVENTION

In the following, embodiments of the invention will be discussed in more detail by way of example only and with reference to the appended drawings. It should be understood, however, that the drawings are not intended to limit the invention to the subject-matter depicted in the drawings. For sake of clarity, the prior art container handling vehicles illustrated in FIGS. 1 and 2a-b, are given the reference number 9, while the container handling vehicles according to the invention are given the reference number 32.

A schematic view of an exemplary container handling vehicle 32 according to the invention is shown in FIGS. 5-9. The purpose of the present invention is to provide a container handling vehicle, wherein the risk of having a deviation or slight inclination of the container/lifting frame with respect to the horizontal cross-section of the storage column when retrieving/introducing a storage container from/to a storage column is reduced. The FIGS. 5-9 are intended to illustrate the function and features of the inventive lifting device 34, and for sake of clarity the means by which the container handling vehicle is moved and arranged above the top level of the grid 4 is not shown (see for instance the embodiments in FIGS. 10-12 for examples of such means, i.e. wheels, gantry).

Figure 5:
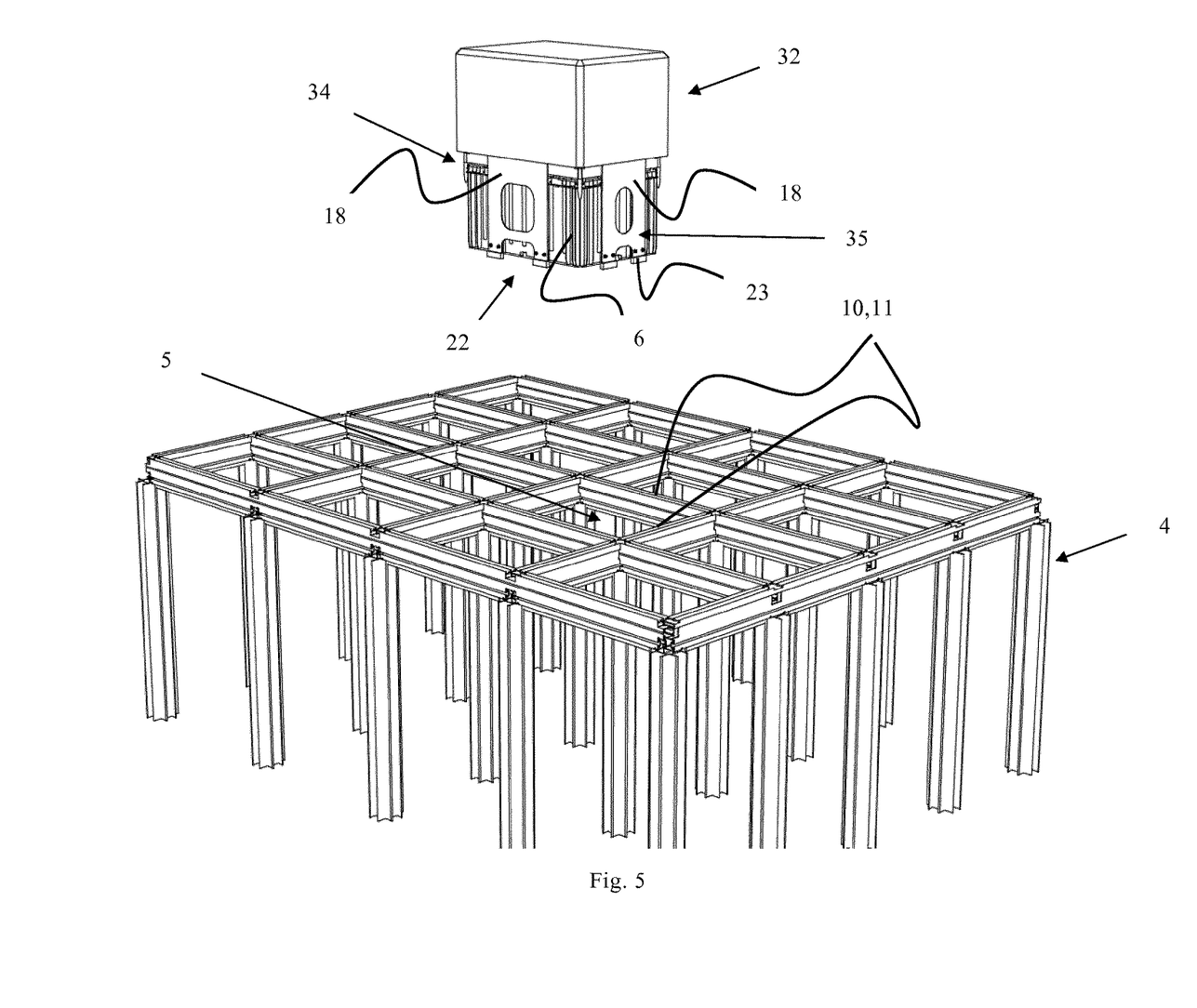
FIG. 5 is a perspective schematic view of an exemplary container handling vehicle according to the invention.
Figure 6:
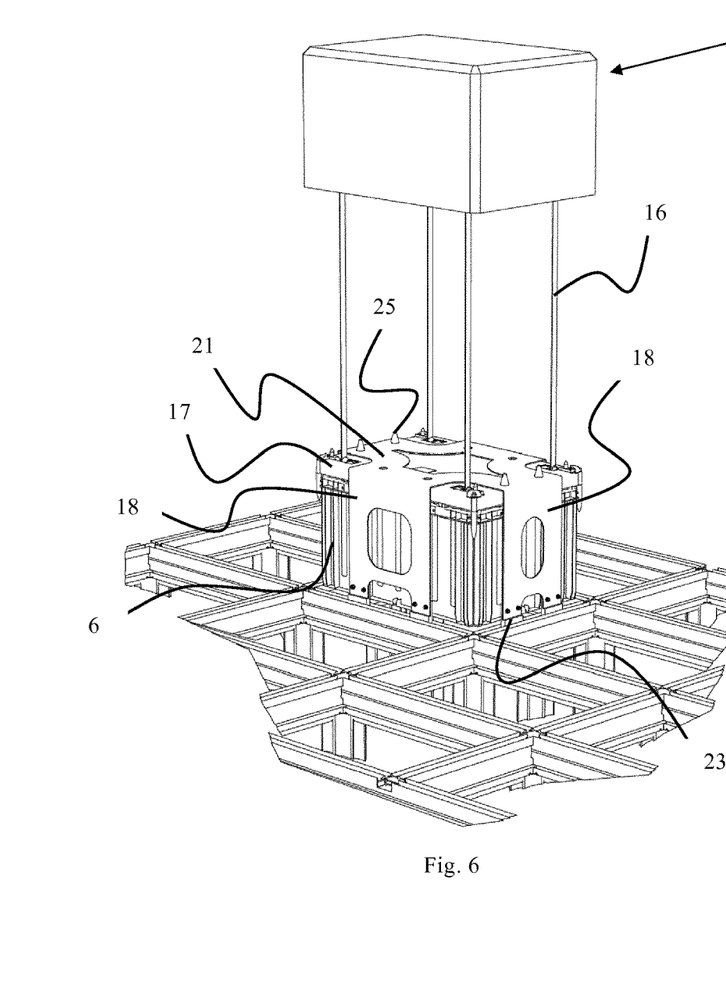
FIGS. 6-8 are perspective sequential views of the container handling vehicle in FIG. 5, wherein a container is lowered into a storage column.
Figure 7:
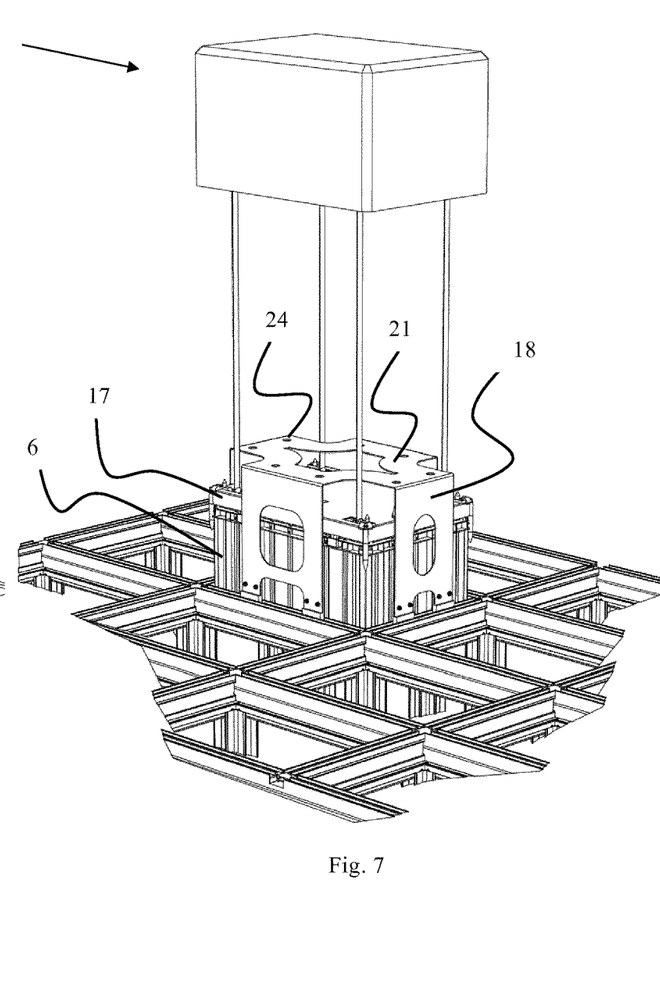
Figure 8:
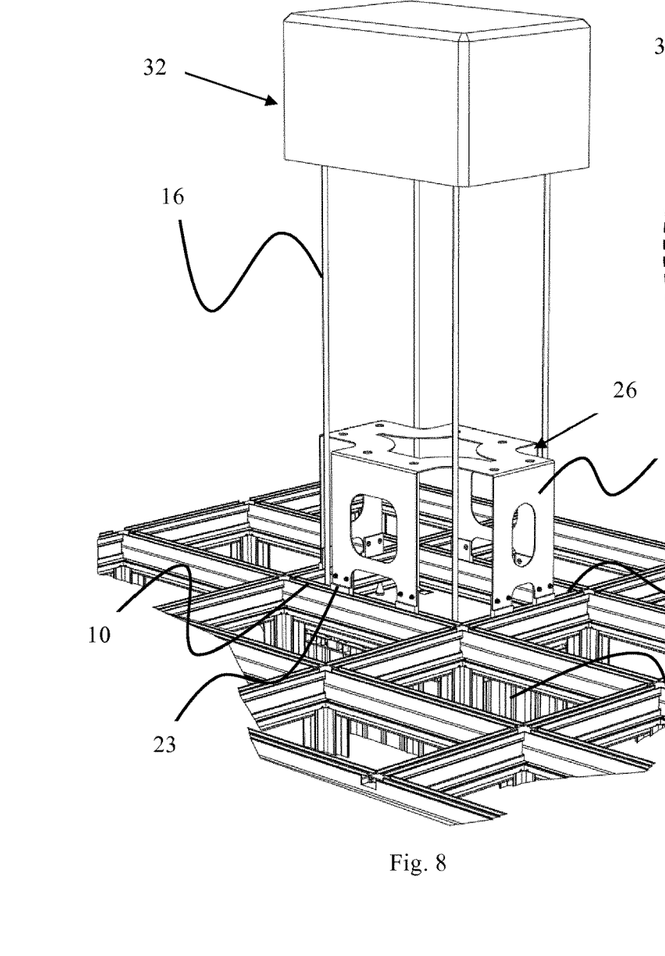
Figure 9:
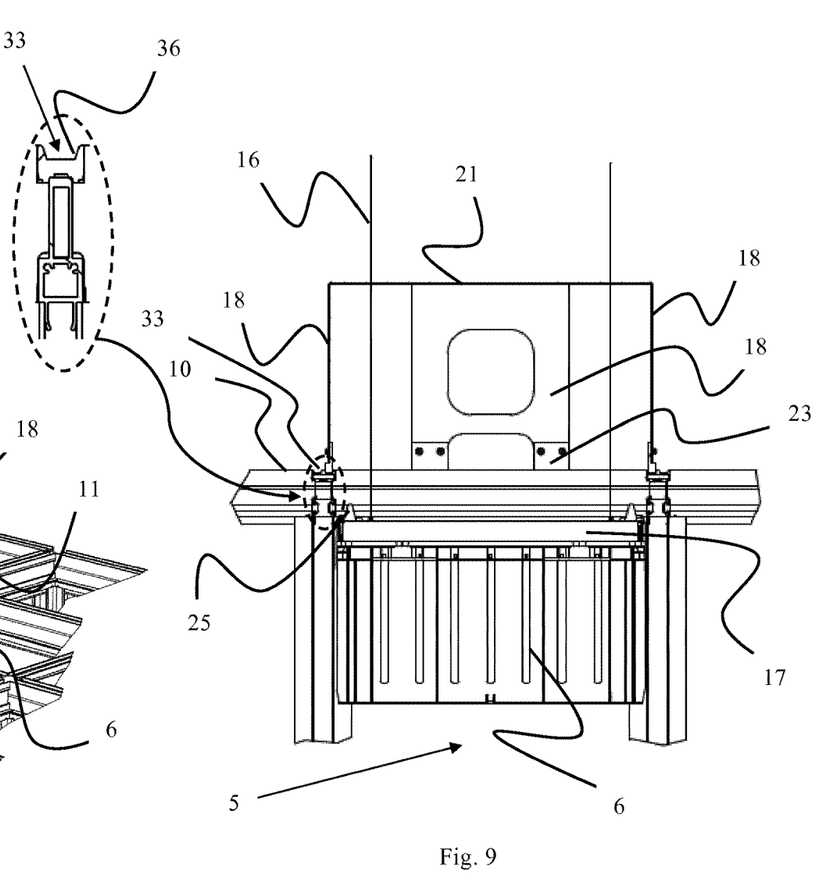
FIG. 9 is a side view of the lifting device of the container handling vehicle in FIG. 8.

The lifting device 34 of the container handling vehicle 32 according to the invention comprises a lifting frame 17 for releasable connection to a container 6, lifting bands 16 arranged to lower and raise the lifting frame 17 relative the storage columns 5 and a container centring device 35 which is arranged to accommodate the lifting frame 17 and the container 6 connected thereto.

To raise or lower the lifting frame 17 (and optionally a connected storage container), the lifting bands 16 are spooled on/off at least one rotating lifting shaft (not shown) arranged in the container-handling vehicle. Various designs of the at least one lifting shaft are described in for instance WO2015/193278 A1 and PCT/EP2017/050195, which are hereby incorporated by reference.

The container centring device 35 has a lower open end 22 with an inner periphery allowing entry and exit of the storage container. At the lower open end, multiple edge elements 23 are arranged. The edge elements 23 are suitable for interaction with the rails 10,11 arranged at the periphery of the upper end of each storage column 5 (i.e. suitable for interaction with a peripheral part of the storage column, the peripheral part arranged around the upper end/opening of the storage column). The edge elements are arranged such that the accommodated container 6 and the lifting frame 17 are centred relative to said upper end when the edge elements 23 interact with the rails 10,11 (more specifically, the edge elements 23 are lowered into longitudinal recesses/tracks 33 in the rails 10,11), see FIG. 6. The interaction between the edge elements and the rails ensures that horizontal and vertical deviations of the container centring device 35 relative the storage column 5 are eliminated before the lifting frame 17 and the storage container 6 are introduced to the storage column 5. Preferably, the longitudinal recesses/tracks 33 in the rails 10,11 have a trapezoidal cross-section, see FIG. 9. The inclined side walls 36 of the tracks 33 ensure an optimum centring of the centring device when interacting with the edge elements 23. Due to the centring of the storage container 6 and the lifting frame 17, the lifting frame 17 and the storage container 6 may be introduced into the opening of the storage column 5 with a high degree of control.

The container centring device 35 is supported on top of the lifting frame 17. To prevent horizontal movement of the container centring device 35 relative the lifting frame 17 during lowering towards the storage columns 5, a top element 21 of the container centring device 35 features multiple recesses/cut-outs 24 interacting with corresponding projections 25 arranged on top of the lifting frame 17. Further, the top element 21 features recesses/cut-outs 26 for the lifting bands 16 connected to the lifting frame 17. Thus, before the edge elements 23 interact with the rails 10,11, the container centring device 35 is prevented from moving relative to, and is lowered together with, the lifting frame 17 and the storage container 6. The edge elements 23 extend below the storage container 6 connected to the lifting frame 17 before they interact with the rails 10,11. When the edge elements 23 have landed upon the rails, the container centring device is kept stationary, while the lifting frame 17 and the connected storage container 6 may be lowered further into the storage column 5 (i.e. the lifting frame 17 may be lowered relative the container centring device 35 when the edge elements 23 interact with the periphery of the upper end of the storage column), see FIGS. 7-9.

When a storage container 6 is to be retrieved from the storage column 5, the container centring device 35 will also ensure that the lifting frame 17 is introduced correctly into the storage column 5.

In this embodiment, the container centring device 35 is made up of four separate vertical side elements 18 and a top element 21. Each of the side elements 18 features two separate edge elements 23, and the top element 21 is arranged above, and supported by, the lifting frame 17. The side elements are thin-walled to allow container handling vehicles to pass by the container centring device when arranged on top of a storage column. This particular design of the container centring device 35 is very light which is an advantage in that the lifting capacity of the lifting device 34 is not substantially affected. However, based on the present disclosure, a number of various designs would be obvious to the skilled person.

Two specific embodiments of container handling vehicles 32 according to the invention are shown in FIGS. 10a-b and FIGS. 11-12, respectively.

Figure 10A:
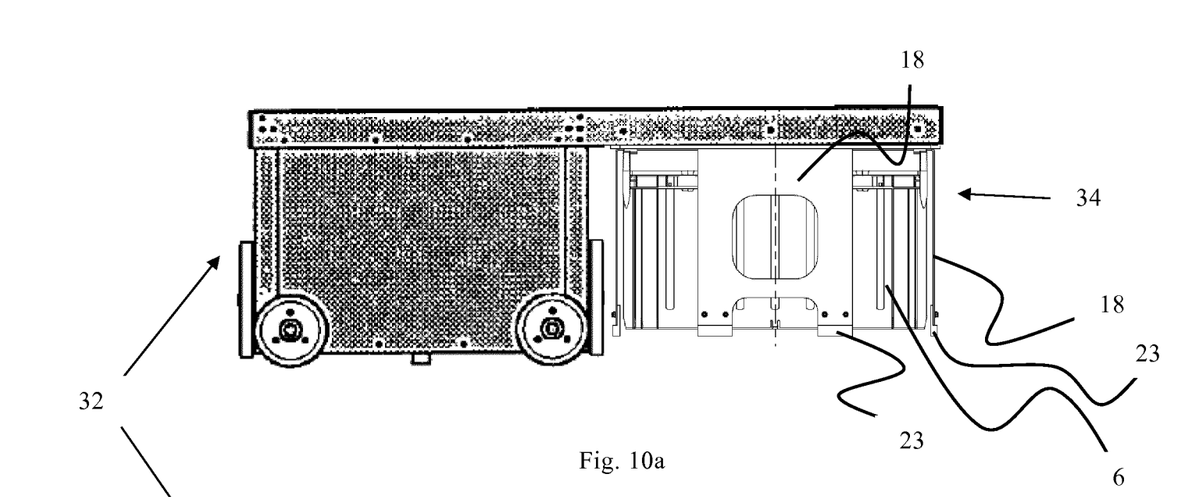
FIGS. 10a and 10b are side views of a first embodiment of a container handling vehicle according to the invention.
Figure 10B:
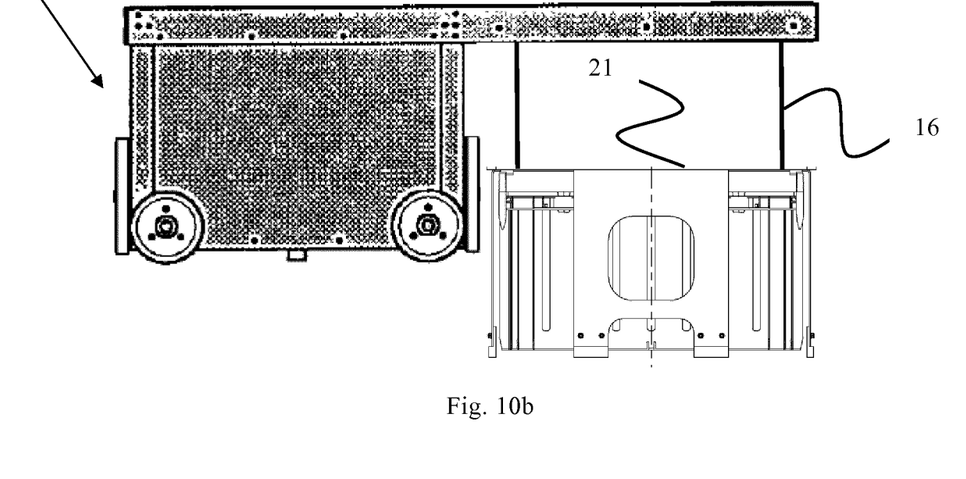

The container handling vehicle 32 in FIGS. 10a and 10b is based on the prior art vehicle 9 disclosed in the Norwegian patent NO317366 and shown in FIG. 2b. The description of NO317366 relating to the container handling device in FIG. 2b and its function is hereby incorporated by reference. The main difference between the vehicle in FIG. 2b and the vehicle in FIGS. 10a and 10b lies in the container lifting device 34 featuring a container centring device 35 as described above.

Figure 11:
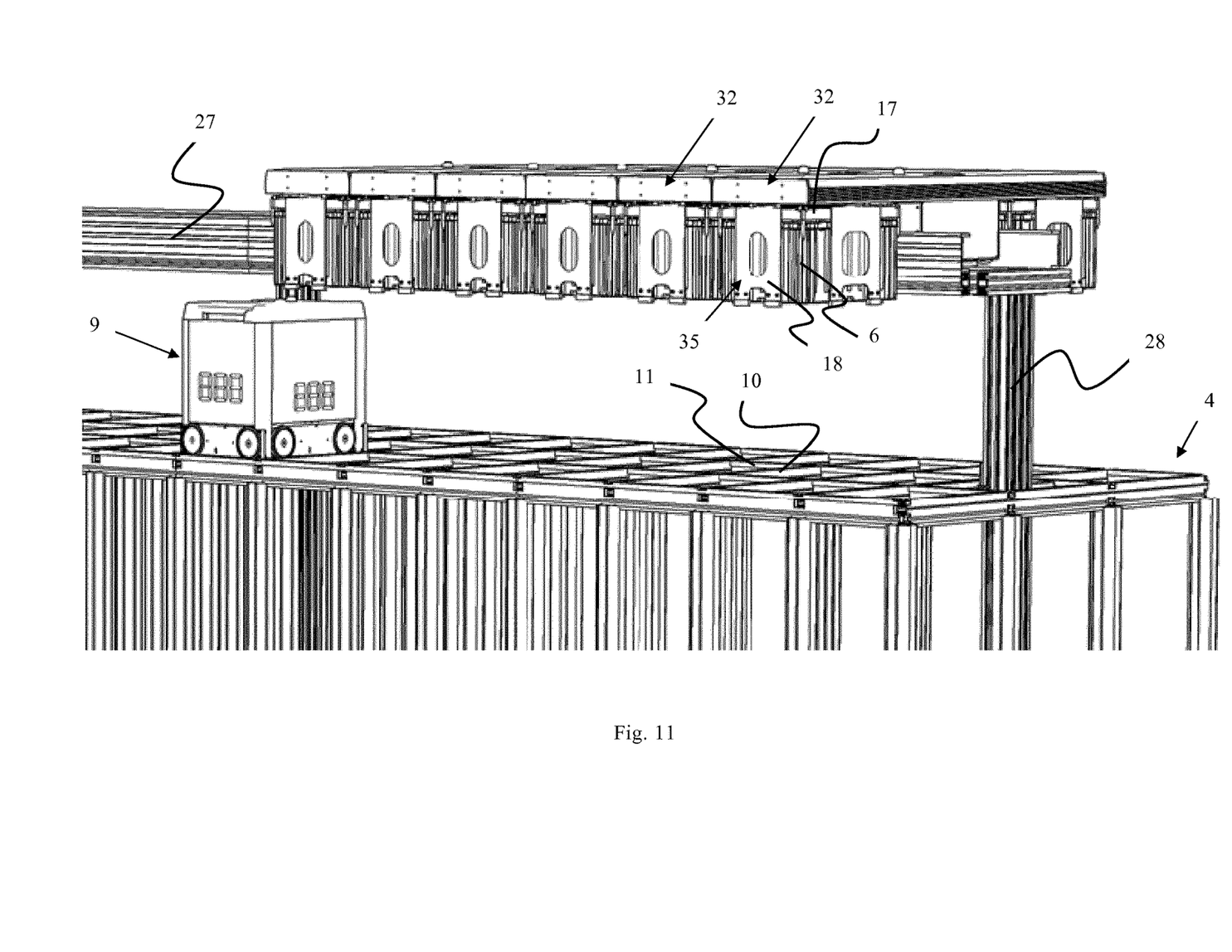
FIG. 11 is a perspective view of a second embodiment of a container handling vehicle according to the invention.
Figure 12:
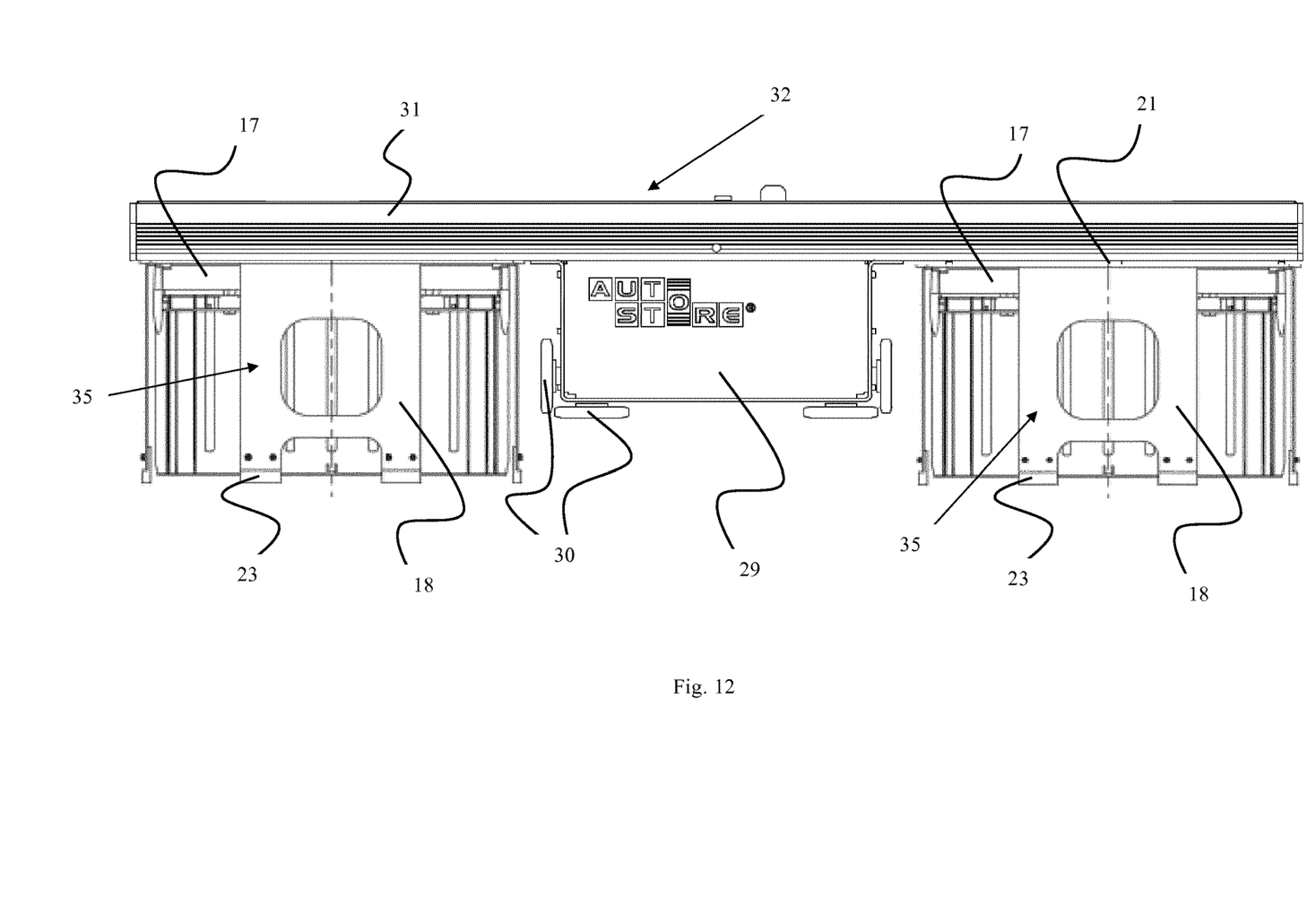
FIG. 12 is an end view of the second embodiment of FIG. 11.

The container handling vehicle 32 in FIGS. 11 and 12 is specifically designed to move along a monorail/profiled gantry/beam 27 arranged above the top level of the storage grid 4. The vehicle 32 features a vehicle body 29 having a horizontal extension 31 to which extension two lifting devices, each comprising a lifting frame 17 and a container centring device 35, are connected at opposite ends. The vehicle body 29 is movable along the profiled gantry/beam by use of wheels 30. In the embodiment of FIGS. 11 and 12, the container centring device is particularly advantageous, since the two lifting devices may introduce a slight tipping of the vehicle body when the loads of the lifting devices are sufficiently different.

FIG. 11 shows a section of an automated storage and retrieval system featuring multiple container handling vehicles 32 arranged on a beam 27 and a container handling vehicle 9 arranged on the top level of the grid. The beam 27 is supported by a column 28 and arranged at a level above the top level of the grid 4, such that the container handling vehicle 9 on the top level may pass directly below the multiple container handling vehicles 32 during operation.

The invention claimed is:

1. A container handling vehicle for an automated storage and retrieval system comprising a three-dimensional grid having multiple storage columns, in which containers are stored one on top of another in vertical stacks;
the container handling vehicle being arrangeable above a top level of the grid for retrieving a container from, and storing a container in, at least some of the storage columns, and/or for transporting a container horizontally across the top level of the grid;
the container handling vehicle having a lifting device comprising a lifting frame for releasable connection to a container, and lifting bands arranged to lower and raise the lifting frame relative to the storage columns, wherein
the lifting device comprises a container centring device arranged to extend around portions of the lifting frame,
the container centring device having a lower open end comprising at least one edge element for interaction with a peripheral part of the upper end of a storage column, the edge element being arranged such that a container connected to the lifting frame is centred relative said upper end when the edge element interacts with the peripheral part.

2. A container handling vehicle according to claim 1, wherein the container centring device is supported by the lifting frame, such that the lifting frame may be lowered relative the centring device when the edge element of the container centring device interacts with the peripheral part of the upper end of the storage column.

3. A container handling vehicle according to claim 2, wherein the container centring device comprises a vertical side element and a top element, the side element comprising the at least one edge element; and wherein the top element is arranged above the lifting frame, such that the top element is supported by the lifting frame when the edge element is not interacting with the peripheral part of the upper end of the storage column.

4. A container handling vehicle according to claim 3, wherein the container centring device comprises multiple vertical side elements interconnected by the top element, each of the side elements comprising an edge element, preferably wherein the container centring device comprises four vertical side elements, each element arranged to be parallel to a respective side wall of a container connected to the lifting frame.

5. A container handling vehicle according to claim 1, wherein the container centring device comprises a vertical side element and a top element, the side element comprising the at least one edge element; and wherein the top element is arranged above the lifting frame, such that the top element is supported by the lifting frame when the edge element is not interacting with the peripheral part of the upper end of the storage column.

6. A container handling vehicle according to claim 5, wherein the container centring device comprises multiple vertical side elements interconnected by the top element, each of the side elements comprising an edge element, preferably wherein the container centring device comprises four vertical side elements, each element arranged to be parallel to a respective side wall of a container connected to the lifting frame.

7. A container handling vehicle according to claim 5, wherein the top element comprises the at least one projection or recess of the container centring device, preferably wherein the top element comprises at least two projections or recesses.

8. A container handling vehicle according to claim 5, wherein the top element comprises openings or recesses through which the lifting bands are arranged.

9. A container handling vehicle according to claim 1, wherein the at least one edge element is arranged to extend below a container connected to the lifting frame when the edge element is not interacting with the peripheral part of the upper end of the storage column.

10. A container handling vehicle according to claim 1, wherein the at least one edge element is arranged to interact with rails forming the peripheral part of the upper end of the storage column, preferably the at least one edge element is arranged to interact with longitudinal tracks arranged in the rails.

11. A container handling vehicle according to claim 1, wherein the container centring device comprises at least one of a projection or recess for interaction with a cooperating recess or projection, respectively, on the lifting frame, such that a horizontal movement of the container centring device relative to the lifting frame is prevented when the container centring device is supported by the lifting frame.

12. A container handling vehicle according to claim 11, wherein the top element comprises the at least one projection or recess of the container centring device, preferably wherein the top element comprises at least two projections or recesses.

13. An automated storage and retrieval system comprising at least one first container handling vehicle according to claim 1, wherein the storage and retrieval system comprises a three-dimensional grid having multiple storage columns, in which containers are stored one on top of another in vertical stacks, and the first container handling vehicle is movably arranged above a top level of the grid, such that the first container handling vehicle may pass directly above a second container handling vehicle arranged on the top level of the grid, during operation of the system.

14. An automated storage and retrieval system according to claim 13, comprising at least one horizontal beam arranged above the top level of the grid, on which beam the first container handling vehicle is movably arranged.

15. An automated storage and retrieval system according to 14, wherein the at least one horizontal beam is part of a gantry, monorail or rail grid, arranged such that the first container handling vehicle may move in at least one horizontal direction relative the top level of the grid.

16. An automated storage and retrieval system according to claim 13, wherein the at least one horizontal beam is part of a gantry, monorail or rail grid, arranged such that the first container handling vehicle may move in at least one horizontal direction relative the top level of the grid.

* * * * *